US010769846B2

(12) United States Patent
Georgiou

(10) Patent No.: US 10,769,846 B2
(45) Date of Patent: Sep. 8, 2020

(54) POINT CLOUD DATA COMPRESSION IN AN AUTONOMOUS VEHICLE

(71) Applicant: GM GLOBAL TECHNOLOGY OPERATIONS LLC, Detroit, MI (US)

(72) Inventor: Georgios Georgiou, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 16/158,262

(22) Filed: Oct. 11, 2018

(65) Prior Publication Data

US 2020/0118331 A1 Apr. 16, 2020

(51) Int. Cl.
*G06K 9/00* (2006.01)
*G06T 17/05* (2011.01)
*G05D 1/00* (2006.01)
*G05D 1/02* (2020.01)

(52) U.S. Cl.
CPC .......... *G06T 17/05* (2013.01); *G05D 1/0088* (2013.01); *G05D 1/0251* (2013.01); *G06K 9/00201* (2013.01); *G06K 9/00791* (2013.01)

(58) Field of Classification Search
CPC .......... G06K 9/00791; G06K 9/00201; G05D 1/0088; G05D 1/0251; G06T 17/05; G06T 17/00; G06T 2210/56; G06T 9/00
See application file for complete search history.

(56) References Cited

U.S. PATENT DOCUMENTS

| 8,379,994 | B2 | 2/2013 | Dai et al. |
| 8,731,313 | B2 | 5/2014 | Thiyanaratnam et al. |
| 9,796,400 | B2 * | 10/2017 | Puttagunta ............ B61L 25/025 |
| 9,911,340 | B2 | 3/2018 | Samarasekera et al. |
| 2011/0216063 | A1 * | 9/2011 | Hayes ...................... G06T 17/20 |
| | | | 345/423 |
| 2016/0047903 | A1 | 2/2016 | Dussan |
| 2019/0179022 | A1 * | 6/2019 | Agarwal ................. G01S 17/89 |
| 2019/0228050 | A1 * | 7/2019 | Chou ................... H03M 7/3077 |
| 2020/0021847 | A1 * | 1/2020 | Kim ..................... H04N 19/597 |

\* cited by examiner

*Primary Examiner* — Amara Abdi
(74) *Attorney, Agent, or Firm* — Medley, Behrens & Lewis, LLC

(57) ABSTRACT

Autonomous vehicles and techniques that can be utilized to compress point cloud data and operate on compressed point cloud data are provided. An autonomous vehicle can include a data compression system can configure point cloud data according to a collection of three-dimensional (3D) tiles representative of the region. Each 3D tile can include a portion of the cloud point data, where each point vector in the portion of the cloud point data can be configured relative to a position vector of the 3D tile defined in a coordinate system of the collection of 3D tiles. The data compression system can utilize a fixed-point Q-format representation based on a defined number of bits to compress at least a portion of the point cloud data. The autonomous vehicle also can include a control system that can operate mathematically on compressed point cloud data, without reliance on prior decompression.

20 Claims, 7 Drawing Sheets

POINT CLOUD DATA COMPRESSION IN AN AUTONOMOUS VEHICLE

BACKGROUND

An autonomous vehicle is a motorized vehicle that can operate without a human driver. An autonomous vehicle can include, for example, multiple sensor systems, such as a lidar sensor system, an imaging sensor system, and a radar sensor system, amongst others. The autonomous vehicle utilizes sensor signals output by the sensor systems to control its operation.

As the autonomous vehicle is operated, sensor signals from a sensor system can provide a substantive amount of data representative of the surroundings of the autonomous vehicle. Such data can include point cloud data representative of a region relative to the autonomous vehicle and, thus, can have a rich, complex structure. Further, the data can be formed from input signals from several sensor systems of the autonomous vehicle. Such a consolidation can render the data even more voluminous. According to an illustration, each point in three-dimensional (3D) space maintained in a point cloud data structure can have multiple channels (signals) such as, for example, position of a point in 3D space, point cloud distribution around the point (covariance), surface normal vector around the point, color channels, etc.

As such, storage of point cloud data typically includes compression of at least some of the point cloud data. Yet, conventional technologies to compress point cloud data typically rely on decompression of compressed point cloud data prior to operating mathematically on such data. Even as memory devices become smaller and cheaper, issues including memory fragmentation, virtualization, and other memory management techniques, can preclude from enlarging the data storage available in an autonomous vehicle. Therefore, much remains to be improved in conventional technologies to compress and manipulate data representative of the surroundings of an autonomous vehicle.

SUMMARY

The following is a brief summary of subject matter that is described in greater detail herein. This summary is not intended to be limiting as to the scope of the claims.

The disclosure recognizes and addresses, in at least some embodiments, the issue of compression of point cloud data and other processing of such data in autonomous vehicles. More specifically, yet not exclusively, the disclosure provides autonomous vehicles and techniques to compress point cloud data and perform mathematical operations on compressed point cloud data.

In some embodiments, an autonomous vehicle can include a sensor system that generates point cloud data representative of a region relative to the autonomous vehicle. The sensor system can supply at least a portion of the point cloud data to a data compression system of the autonomous vehicle. The data compression system can configure the received point cloud data according to a collection of three-dimensional (3D) tiles representative of the region. Splitting the 3D space into 3D tiles can enable limiting a numerical range to represent each point within the point cloud when expressed with respect to the tile it belongs. Each 3D tile of the 3D tiles can include a portion of the cloud point data, where each point vector in the portion of the cloud point data can be configured relative to a position vector of the 3D tile defined in a coordinate system of the collection of 3D tiles. It is contemplated that the point cloud aggregation and compression described herein can be performed on-the-fly, for example. According to another example, the data compression system can be utilized for an offline procedure such that the point cloud can be created as an aggregate of sensor data snapshots, which can then be compressed together to enable creating point cloud maps.

The data compression system can utilize a fixed-point Q-format representation based on a defined number of bits in order to determine an integer representation of the point vector. The integer representation permits replacing the point coordinates of the point vector, initially in floating point representation, with respective rational numbers based at least on the defined number of bits and a size of the 3D tile. For a collection of 3D tiles having a same size for each tile, the data compression system can retain integer numbers for respective point vector coordinates and a point vector representing the origin of each tile (which can additionally or alternatively be inferred from the index and the size of the tile), thus compressing the received point cloud data.

The autonomous vehicle also can include a control system that can operate mathematically on compressed point cloud data, without reliance on prior decompression of the point cloud data operated upon. The control system can guide motion of the autonomous vehicle based at least on results from operating on the compressed point cloud data. Moreover, it is contemplated that a map-based localization system (e.g., sensor point cloud alignment against the point cloud map) or a perception system (e.g., match traffic lights, signs seen by the sensors against the point cloud map) of the autonomous vehicle can utilize the compressed point cloud data.

Although embodiments of the disclosure are illustrated herein with reference to point cloud data, the disclosure is not limited in that respect and the principles of the disclosure can be implemented for other types of data including numeric data records.

Embodiments of the disclosure provide several technical benefits. For example, an integer representation of point cloud data of this disclosure reduces bandwidth usage for storage and retrieval of compressed point cloud data. In addition, greater speed of storage of compressed point cloud data and greater speed of access of stored compressed point cloud data can be achieved by processing integer numbers according to a defined number of bits. As another example, not only can the compressed data be operated upon directly, without prior decompression, but the processing speed to operate mathematically on the compressed data increases because integer arithmetic logic units (ALUs) and graphics processing units (GPUs) can be utilized for processing the compressed point cloud data. Further, by relying on a fixed-point Q-format representation, fixed precision can permit or otherwise facilitate determining numerical error bounds and/or performing significant digit analysis. At least the foregoing technical benefits can provide superior reliance, flexibility, and/or efficiency relative to conventional technologies for compression of data and manipulation of compressed data. These and other technical benefits can be realized through an implementation of the disclosed technologies.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
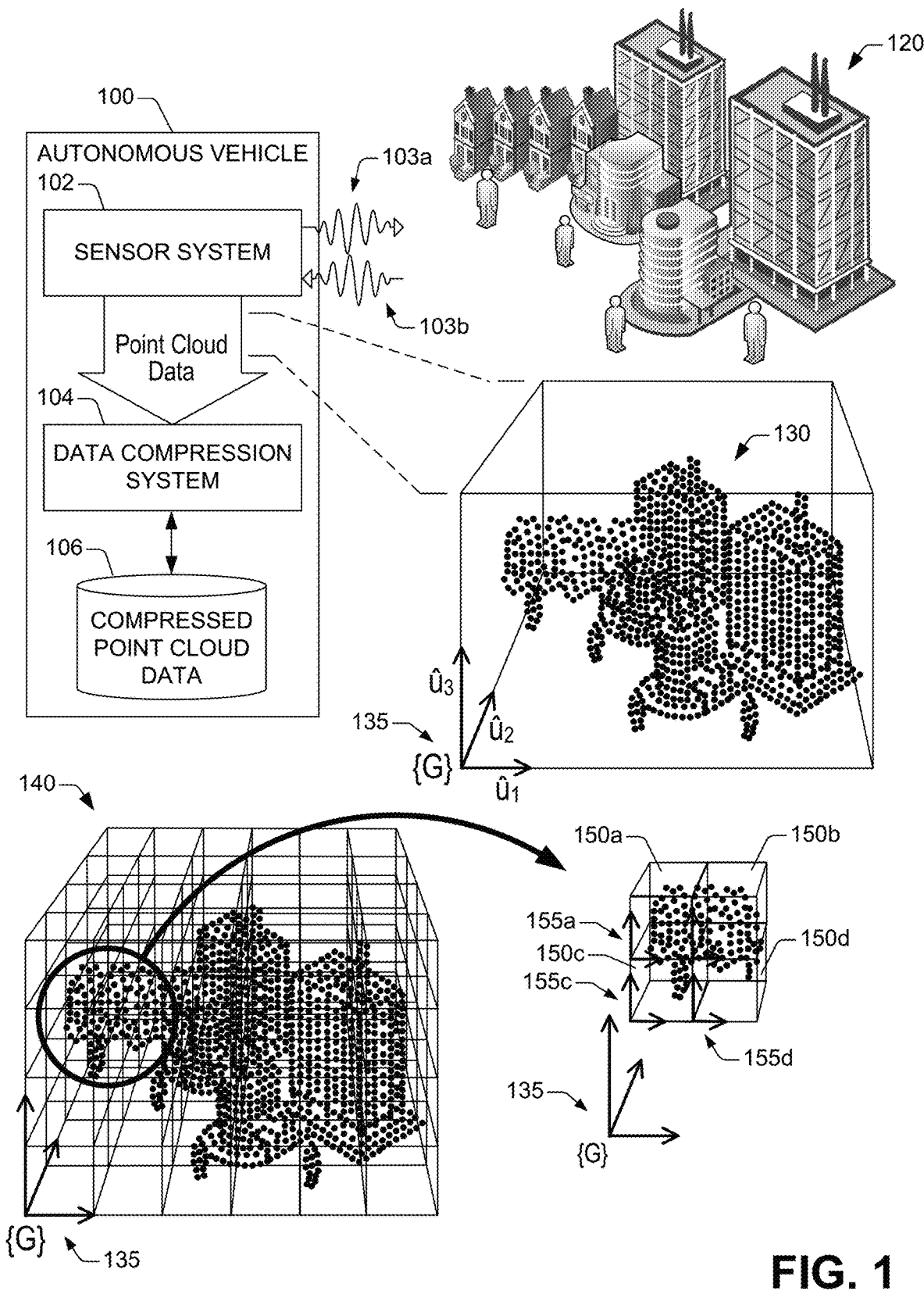
FIG. 1 illustrates an example of an autonomous vehicle in accordance with one or more embodiments of the disclosure.

As mentioned, the disclosure recognizes and addresses, in at least some embodiments, the issue of compression of point cloud data and processing of such data in autonomous vehicles. More specifically, yet not exclusively, the disclosure provides technologies that permit or otherwise facilitate the compression of point cloud data and the performance of mathematical operations on point cloud data compressed in accordance with aspects described herein. As set forth herein, like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component, system, or module may be localized on a single device or distributed across several devices. Further, as used herein, the term "exemplary" is intended to mean serving as an illustration or example of something and is not intended to indicate a preference.

With reference to the drawings, FIG. 1 illustrates an example of an autonomous vehicle 100 that operates in accordance with aspects of this disclosure. The autonomous vehicle 100 can navigate about roadways without human conduction based at least on sensor signals output by one or more sensor systems of the autonomous vehicle 100. As is illustrated, the autonomous vehicle 100 includes a sensor system 102 that can include multiple sensor devices that provide (e.g., generate and/or output) sensor signals. The sensor devices can be arranged about the autonomous vehicle 100. In some embodiments, the multiple sensor devices can be homogenous and can generate and output sensor signal of a defined type. Thus, the sensor system 102 can generate data of a particular type. For example, each one of the multiple sensor devices can include light source devices (e.g., infrared laser devices) and photodetector devices, and the sensor system 102 can embody a lidar sensor system that generates lidar data representative or otherwise indicative of a region relative to the autonomous vehicle 100.

In other embodiments, the multiple sensor devices can be heterogeneous and can generate and output sensor signals of various types. As such, the sensor system 102 can generate data of different types. For example, the multiple sensor devices can include a first type of sensor devices and a second type of sensor devices. Thus, the sensor system 102 can include a first sensor system that includes the first type of sensor devices and a second sensor system that includes the second type of sensor devices. In one embodiment, the first sensor system can embody a lidar sensor system and the second sensor system can embody a radar sensor system. The disclosure, however, is not limited to a first and second sensor system and, in some embodiments, the sensor system 102 can be embodied in or can include multiple types of sensor systems that provide respective types of data. The multiple types of sensor systems can include, for example, a combination of a lidar sensor system, a radar sensor system, a sonar sensor system, a global positioning system (GPS) sensor system, a thermal sensor system (such as an infrared sensor system), an imaging system (e.g., a monocular camera, a stereo camera, a multi-camera rig system), and the like.

The sensor system 102, regardless its specific architecture, can generate data representative of a region relative to the autonomous vehicle 102. To that end, the sensor system 102 can emit electromagnetic radiation 103a of a defined type in multiple directions. At least a portion of the electromagnetic radiation 103a can scatter into objects of other types of structure in the region causing, in some instances, reflected electromagnetic radiation 103b to be received at the sensor system 102. The reflected electromagnetic radiation 103 can be utilized to generate such data. The region can include a space within a defined distance from the autonomous vehicle. The space can be determined, for example, by a vantage point (or field of view) of sensor devices within the sensor system 102 that generates the data. The space also can be determined by meteorological conditions, such as a visibility conditions, in an environment in which the autonomous vehicle 100 operates. As such, in one example, the region can be proximate or otherwise neighboring to the autonomous vehicle 100, where the distance is of the order of tens of meters from the autonomous vehicle 100. In another example, the region can surround, at least partially, the autonomous vehicle 100.

The data generated by the sensor system 102 can include structured and/or unstructured data. In addition, or in some embodiments, the data can be embodied in a universal data set that includes temporally and spatially corresponding sensor data of different types (imaging data, lidar scan data, radar scan data, etc.). Each one (or, in some embodiments, at least one) of the data records included in the data can be formatted according to a defined format. For example, the defined format can be the American Standard Code for Information Interchange (ASCII). As another example, in an embodiment in which the sensor system 102 includes a lidar sensor system that generates at least a portion of the point cloud data, the defined format can be the LAS format. Such a format has been sanctioned and specified by The American Society for Photogrammetry & Remote Sensing.

At least a portion of the data generated by the sensor system 102 can include point cloud data. The point cloud data can be representative of structures 120 that can be present within the region. The structures can include inanimate objects and other types of objects that can move relative to the autonomous vehicle 100, within or across the region. Inanimate objects can include, for example, buildings, signage, utility equipment (such as telephone poles, electric grid poles, base station towers, or the like), and so forth. Objects that can move relative to the autonomous vehicle 100 can include, for example, pedestrians, animals (wildlife and domesticated), bikes, cars (autonomous or otherwise), trucks, buses, and the like.

As is pictorially depicted in FIG. 1, the point cloud data can include multiple point data records 130. The point data records 130 can be representative or otherwise indictive of the structures 120. Each one of the multiple point data records 130 can include point coordinates determined by a defined coordinate system (such as a Cartesian coordinate system or another type of orthogonal coordinate system) utilized to characterize a position of the autonomous vehicle 100 relative to the surroundings of the autonomous vehicle 100. For example, a Cartesian coordinate system 135 can have versors $\widehat{u_1}$ (e.g., $\hat{x}$), $\widehat{u_2}$ (e.g., $\hat{y}$), or $\widehat{u_3}$ (e.g., $\hat{z}$), and can permit specifying point coordinates included in the point data records 130. The Cartesian coordinate system 135 is represented with a label {G}, for the sake of nomenclature.

The point data records 130 can have a rich, complex spatial arrangement based on a number of factors, such as visibility conditions, positioning of the autonomous vehicle 100, and the like. The point data records 130 can be confined within a bounding box 135 or another type of bounding surface that contains such records. In addition, the point data records 130 can correspond to a defined instant t (a real number in units of time) or a defined time period Δt (a real number in units of time, e.g., 1 ms, 5 ms, 10 ms) corresponding to a time interval during which measurements are performed by the sensor system 102.

As the autonomous vehicle 100 traverses a region, the sensor system 102 can generate point cloud data (and, in some instances, other type of data) representative of the region at a defined rate f (a real number in units of frequency). Therefore, the amount of point data records included in the point cloud data can increase considerably during the operation of the autonomous vehicle 100.

As such, as is illustrated in FIG. 1, the autonomous vehicle 100 can include a data compression system 104 that permits or otherwise facilitates the compression of the point cloud data in accordance with this disclosure. To that end, the compression system 104 can be functionally coupled (e.g., electrically coupled and/or communicatively coupled) to the sensor system 102 and can receive at least a portion of the point cloud data generated by the sensor system 102.

Figure 2:
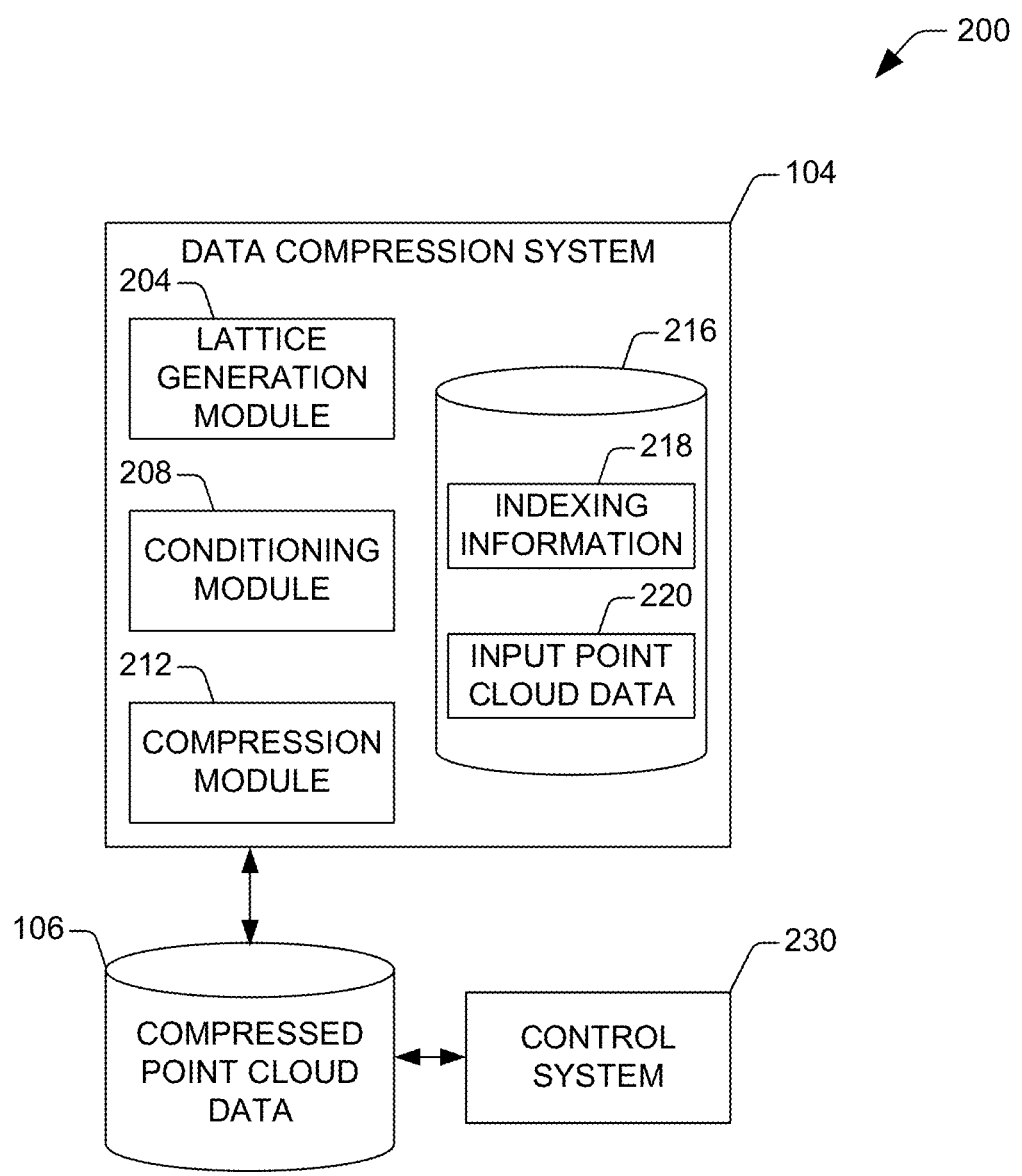
FIG. 2 illustrates an example of a system for the compression of point cloud data and utilization of compressed point cloud data in an autonomous vehicle, in accordance with one or more embodiments of the disclosure.

The data compression system 104 also can generate a lattice representation 140 of a region represented by the point cloud data received from the sensor system 102. In some embodiments, as is illustrated in FIG. 2, the data compression system 104 can include a lattice generation module 204 that can generate the lattice representation. The lattice representation can include, for example, 3D tiles relative to the origin of the Cartesian coordinate system 135. The 3D tiles can be organized in a periodic arrangement that covers the entirety of a bounding box 145 (or another type of bounding surface for the received point cloud data). In one example, the data compression system 104 can arrange the 3D tiles in cubic lattice having a lattice parameter d. Accordingly, a position of each 3D tile in the cubic lattice can be represented as a tile position vector $t=pd\hat{x}+rd\hat{y}+sd\hat{z}$, where each one of q, r, and s is an integer number, indexing the tile in each axis. The lattice generation module 204 can retain composite indices {prs} indicative of respective 3D tiles in a memory element 418 of the one or more memory devices 416. In some embodiments, the lattice parameter d has a magnitude corresponding to a defined power of 2—e.g., $2^{n_d}$ where $n_d$ is a natural number—and is expressed in a defined unit of length. For instance, $n_d=7$ and d=128 m.

In addition, the data compression system 104 can identify subsets of the point cloud data that correspond to respective 3D tiles in the lattice representation. In some embodiments, as is illustrated in FIG. 2, the data compression system 104 can include a conditioning module 408 that can identify such subsets. Each of the subsets can include point vectors expressed in the Cartesian coordinate system 135. Consistent with the lattice representation, each of the respective 3D tiles has a tile position vector relative to the origin of Cartesian coordinate system 135. As an illustration, FIG. 1 presents a detail including a first 3D tile 150a, a second 3D tile 150b, a third 3D tile 150c, and a fourth 3D tile 150d having respective groups of point vectors (depicted as scattered dots).

Further, for each one (or, in some embodiments, at least one) of the subsets of the point cloud data, the data compression system 104 can configure the point vectors included in the 3D tile associated with the subset as a superposition of the tile position vector of the 3D tile and respective offset vectors relative to the tile position vector. In some embodiments, as is illustrated in FIG. 2, the conditioning module 408 can configure the point vectors in such a fashion.

Figure 3:
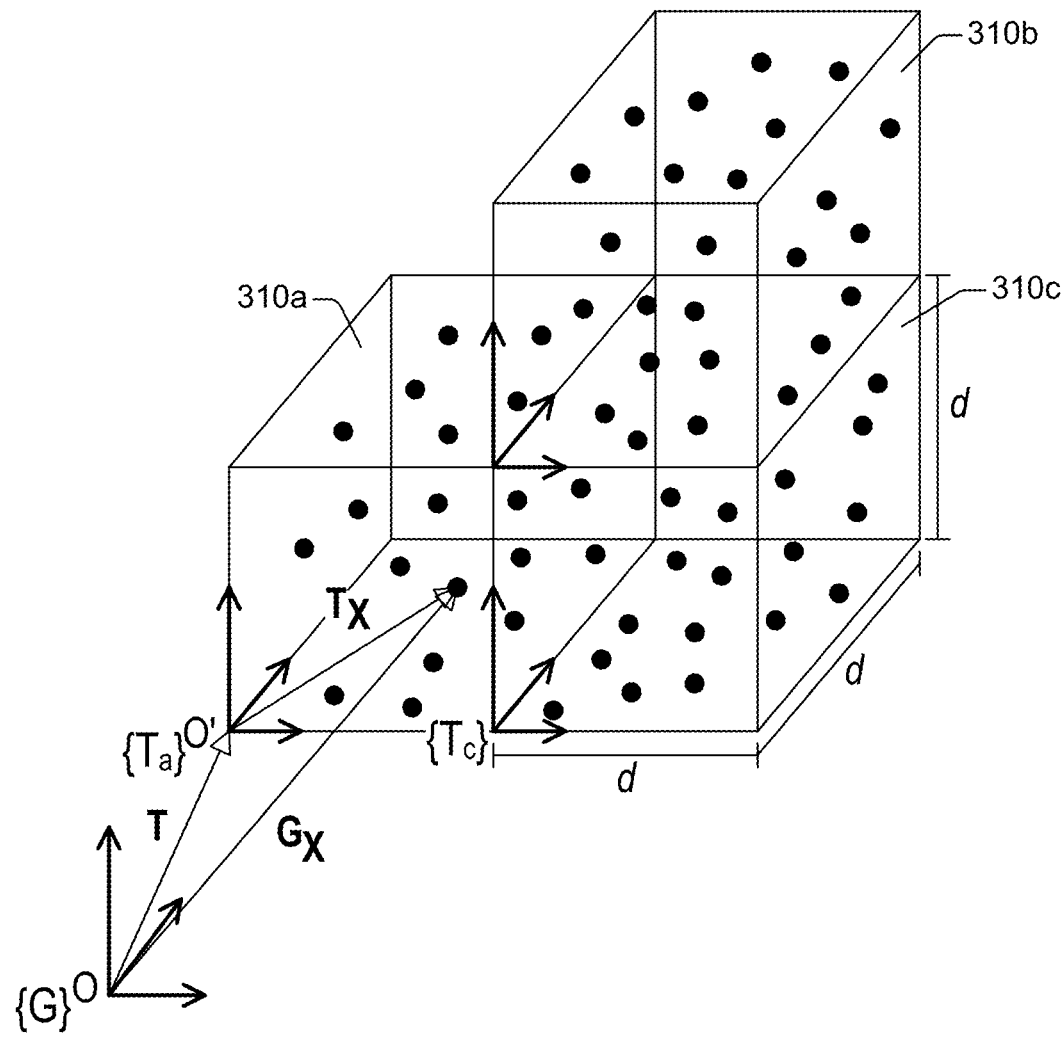
FIG. 3 illustrates a schematic representation of point cloud data in accordance with one or more embodiments of the disclosure.

Stated in other terms, each point vector of the point vectors can be represented in terms of a translation by the tile position vector relative to the Cartesian coordinate system 135. Specifically, an offset vector can be defined relative to a tile Cartesian coordinate system {T} situated in the 3D tile and translated by the tile position vector relative to the Cartesian coordinate system 135. As an illustration, in FIG. 1, tile Cartesian coordinate systems 155a, 155b, and 155c are shown, respectively, in the first 3D tile 150a, the second 3D tile 150c, and the third 3D tile 150d. FIG. 3 illustrates another example configuration of fragment of a lattice representation, including a first 3D tile 310a, a second 3D tile 310b, and a third 3D tile 310b. Respective sets of point vectors are depicted in each one of the 3D tiles 310a-310b. A tile Cartesian coordinate system {Ta} is illustrated for the first 3D tile 310a.

Formally, a point vector $^G X=(u_1, u_2, u_3)$ included in a 3D tile T and defined in the Cartesian coordinate system {G} can be expressed as follows:

$$^G X = {}^G t + {}^T X,$$

where $u_1$, $u_2$, and $u_3$ are real numbers indicative of respective point coordinates of the point vector in the Cartesian coordinate system 135; $^G t$ is the tile position vector of the 3D tile T in the Cartesian coordinate system 135; and $^T X$ is the offset vector of the point vector, in a tile Cartesian coordinate system situated in the tile T.

Here, as it can be gleaned from FIG. 3, $^T X=(v_1, v_2, v_3)$ where $v_1$, $v_2$, and $v_3$ are positive real numbers indicative of respective point coordinates of the offset vector of the point vector in a tile Cartesian coordinate system situated in the tile T. Each one of $v_1$, $v_2$, and $v_3$ is a positive real number in the semi-open range [0, d) regardless of the tile T that is considered because such numbers represent an offset relative to the tile position vector $^G t$. As such, in an embodiment in which $d=2^7 m=128$ m, each one of $v_1$, $v_2$, and $v_3$ is a positive real number in the semi-open range [0, 128 m).

With further reference to FIG. 1, the data compression system 104 can compress each (or, in some embodiments, at least one) offset vector included in a 3D tile of a lattice representation of the region in which the autonomous vehicle 100 operates. To that end, the data compression system 104 can compress an offset vector using an integer representation having a defined number of bits N (a natural number). In some embodiments, the defined number of bits is one of 8 bits, 16 bits, or 32 bits. The integer representation can be an unsigned integer representation because the point coordinates that are compressed (e.g., $v_1$, $v_2$, and $v_3$) correspond to positive real numbers. In some embodiments, as is illustrated in FIG. 2, the data compression system 104 can include a compression module 212 that can compress each (or, in some embodiments, at least one) offset vector included in a 3D tile of a lattice representation of the region in which the autonomous vehicle 100 operates.

The integer representation can be based at least on a fixed-point Q-format representation. Specifically, the fixed-point Q-format representation can be characterized by a first number of bits n for an integer portion of a number (e.g., a point coordinate $x_k$, with k=1, 2, or 3) and a second number of bits m for the fractional portion of the number, where N=n+m. The nomenclature of the fixed-point Q-format representation can be Qn.m. In an embodiment in which N=16, and a region in which the autonomous vehicle 100 operates is represented with a cubic lattice having a lattice parameter d of magnitude $2^{n_d}$ (and a defined unit of length), m can be determined as $m=16-n_d$, where nd is a natural number less than 16. In an example in which $n_d=7$, m=9 and the fixed-point Q-format representation utilized for compression can be indicated as Q7.9.

Accordingly, to compress the offset vector, the data compression system 104 generates at least one integer number in a semi-open range [0, $2^N-1$) for respective point coordinate(s) of the offset vector. In addition, for each (or, in some embodiments, at least one) point coordinate of the respective point coordinate(s) the data compression system 104 replaces the point coordinate v (a real number) with a rational number defined as the ratio of a generated integer number q and a scaling factor $2^m$; formally, $v \cong q/2^m$. More concretely, for example, for the offset vector $^T X=(v_1, v_2, v_3)$, the data compression system 104 can generate integers $q_1$, $q_2$, and $q_3$, each within the semi-open range [0, $2^N-1$).

In an example embodiment in which N=16 and $n_d=7$, the integer m can be equal to 9 and the scaling factor that serves as the denominator in the approximation of a point coordinate of an offset vector $^T X$ in a 3D tile T can be can be $2^9=512$. As such, the data compression system 104 can determine each integer q that approximates, and thus compresses, a point coordinate v of the offset vector by multiplying v by the scaling factor $2^9=512$. In such an embodiment, the accuracy of such an approximation is approximately $$128 \text{ m} - 127\frac{511}{512} \text{ m} = 0.002 \text{ m}.$$

Stated another way, the accuracy of the approximation can be based on the smallest number that can be represented in Q7.9. In the Qn.m format representation, the data compression system 104 can generate a bit-number representation of the integer q. When converting from floating point format to Q-format, the conversion formula, for instance, can be $q=\text{round }(v*2^9)=\text{round }(v*512)$, which can be used to recover $v_{approx}=q>>9$ (the compressed representation). Therefore, the data compression system 104 can retrieve the value v with an accuracy of 0.002 m at least, after compression, by applying a right-shift operator to q; namely, $v=q>>9$. When a point is represented in Q-format, since it is an integer representation, multiplication or division by a number that is a power of 2 (e.g., m) does not require an actual multiplication or division operation; rather, multiplication or division can be implemented with shifts. The foregoing can include the cases of converting back to floating point representation or Q-format normalization when multiplying or dividing with another Q-format number of the same representation.

Further, it is noted that by utilizing a fixed-point Qn.m format representation, a voxelization of a lattice representation can be implemented using shift operations. Voxelization is the process of sparsifying a point cloud by representing all points that fall within a voxel with a single point (e.g., the centroid of the voxel). As set forth herein, a voxelization of any arbitrary resolution can be derived with only integer shift operations instead of expensive floating point divisions, as long as the voxel dimension is a power of 2, not smaller than the accuracy of the representation, and not larger than the size of the tile itself. For instance, for a 3D tile having a cube shape (e.g., a voxel) having a dimension of 1 m=$2^0$ and m=9, a voxel index of the 3D tile can be obtained as q'>>9. In another embodiment in which a dimension of a 3D tile that is cube shaped is $2^{-M}$, a voxel index can be determined as q'>>9-M. As such, in one example, for M=3, the dimension of such a 3D tile is 0.125 m and an index of a tile can be obtained as q'>>6. For instance, for v=0.124, q'=63 and voxel index 63>>6 result in an index equal to 0.

As used herein, the term "voxel" refers to a cubical volume. The cubical volume of a voxel can be a fraction of an overall volume covered by a 3D tile it lies within. A voxel is occupied if at least one point lies within the cubical volume. For instance, to voxelize a 3D tile of dimension 128 m with the points within represented in Q7.9 into cube shapes (e.g., voxels) of dimension 1 m, a voxel index i can be obtained as q<<9. Then, a point ($q_1$, $q_2$, $q_3$) indicates that voxel with coordinates (i,j,k) within the tile is occupied.

The data compression system 104 also can store point cloud data compressed in accordance with this disclosure in one or more memory devices 106 of the autonomous vehicle 100. For a specific Qn.m format utilized for compression, upon or after compression of a point vector $^GX=(u_1, u_2, u_3)$ of the point cloud data, the data compression system 104 can store a 3-tuple $(q_1, q_2, q_3)$ of integer numbers in the memory device(s) 106. The 3-tuple $(q_1, q_2, q_3)$ represents the offset vector $^TX$, and the compressed point vector $^GX$ can be recovered (e.g., $^GX=^Gt+^TX$). The data compression system 104 also can retain the scaling factor 2m in a memory device of the autonomous vehicle 100.

The autonomous vehicle 100 also includes other functional elements beyond those illustrated in FIG. 1. Some of the functional elements can include can include mechanical systems, electro-mechanical systems, and/or electronic systems that can permit or otherwise facilitate effectuating appropriate motion of the autonomous vehicle 100. In one example, such functional elements can include a vehicle propulsion system, a braking system, a steering system, and a diagnostics system.

In some embodiments, as is illustrated in the example system 200 shown in FIG. 2, a control system 230 can utilize compressed point cloud data to control a motion of the autonomous vehicle 100. Specifically, the control system 230 can implement (e.g., execute) a process to control, at least partially, the operation of the autonomous vehicle 100. The process can utilize or otherwise can rely on compressed point cloud data and the control system 230 can perform mathematical operations on the compressed point cloud data. Based at least on results of the process, the control system 230 can control or can permit controlling the motion of the autonomous vehicle 100.

In order to operate on compressed point cloud data, without prior decompression, the control system 230 or another computing system of this disclosure can leverage the integer representation based at least on a fixed-point Q-format representation. More specifically, the integer representation based at least on a fixed-point Q-format representation permits or otherwise facilitates operating mathematically on compressed point cloud data. In sharp contrast to conventional technologies for data compression, performing mathematical operations on the compressed point cloud data can be performed without reliance on prior decompression of such data. More specifically, the fixed-point Q-format representation provides an algebra (which may be referred to as Q-algebra) that includes arithmetic operations based at least on a defined number of bits N utilized to compress the point cloud data.

As mentioned, the fixed-point Q-format representation can be characterized by a first number of bits n for an integer portion of a number (e.g., a point coordinate $x_k$, with k=1, 2, or 3) and a second number of bits m for the fractional portion of the number, where N=n+m. In an embodiment in which N=16 and a region in which an autonomous vehicle operates is represented with a cubic lattice having a lattice parameter d of magnitude $2^{n_d}$ (and a defined unit of length), m can be determined as $m=N-n_d$, where $n_d$ is a natural number less than N.

In such a representation, the Qn.m algebra can be defined for offset coordinates $x^{(T)}, y^{(T)}, z^{(T)}$ of an offset vector $^TX$ for a 3D tile T by defining an addition rule, a multiplication rule, and a division rule. Specifically, after removing T from the nomenclature, for the sake of clarity, the addition $q_1+q_2$ of a first uncompressed offset coordinate $q_1$ and a second uncompressed offset coordinate $q_2$ can be defined as follows, where q represents a coordinate value for one of the versors $\hat{x}, \hat{y}$, or $\hat{z}$ of a tile coordinate system {T} (see, e.g., FIG. 2):

$$q_1 + q_2 = \frac{q_m^{(1)}}{2^m} + \frac{q_m^{(2)}}{2^m} = \frac{q_m^{(1)} + q_m^{(2)}}{2^m} \triangleq \frac{q_m^{(3)}}{2^m} = q_3$$

Thus, the addition rule is $q_m^{(1)}+q_m^{(2)}=q_m^{(3)}$. As such, the addition of two compressed offset coordinates based on a fixed-point Q-format representation in accordance with this disclosure correspond to the sum of such compressed coordinates.

Further, a multiplication $q_1*q_2$ of the first uncompressed offset coordinate $q_1$ and a second uncompressed offset coordinate $q_2$ can be defined as follows:

$$q_1 * q_2 = \frac{q_m^{(1)}}{2^m} + \frac{q_m^{(2)}}{2^m} = \left(\frac{q_m^{(1)} * q_m^{(2)}}{2^m}\right) \triangleq \frac{q_m^{(3)}}{2^m} = q_3$$

Thus, the multiplication rule is $$\frac{q_m^{(1)} + q_m^{(2)}}{2^m} = q_m^{(3)};$$

however, it is contemplated that division need not be performed, instead performing a shift right by m. As such, the multiplication and scaling of two compressed offset coordinates based on a fixed-point Q-format representation correspond to the product of such compressed coordinates.

The division rule is obtained in similar fashion, yielding $(q_m^{(1)}/q_m^{(2)})2^m=q_m^{(3)}$. Similar to above, multiplication need not be performed; rather, a shift left by m can be performed.

In some embodiments, as is disclosed herein, N=16, $n_d$=7 (which can provide a lattice parameter d=128 m), and m=9.

Therefore, the control system 230 can perform mathematical operations directly on the compressed point cloud data according to at least the foregoing Qn.m algebra. As mentioned, the control system 230 can control or can permit controlling a motion of the autonomous vehicle 100 based at least on results of the performance of the mathematical operations.

In an example scenario, the input point cloud data 220 can include first point cloud data received from source device rather than from the sensor system 102 of the autonomous vehicle 100. The source device (not depicted in FIG. 2) can be embodied in or can include a network apparatus (e.g., a server device and a gateway device) and the first point cloud data can be received wirelessly or via a wireline connection. In addition, or in another embodiment, the source device can be embodied in or can include a storage device that can be coupled to the data compression system 104, for example, via an input interface device or network adapter device.

In addition, the data compression system 104 can compress a portion of the first point cloud data using the integer representation having the defined number of bits, as is disclosed herein. The compressed portion of the first point cloud data can be retained in the compressed point cloud data 106.

In order to control operation of the autonomous vehicle 100, the control system 230 can implement a scene registration process between the compressed portion of the first point cloud data and second compressed point cloud data generated by compressing point cloud data generated by the sensor system 102. To that end, for example, the control system 230 can implement at least one of a principal component analysis (PCA) process, a single value decomposition (SVD) process, or an iterative closest point (ICP) process. The implementation of the scene registration process can permit determining a position and orientation of the autonomous vehicle 100. Further, other applications of processing compressed point cloud data can include augmented reality and virtual reality applications. Moreover, an example of the registration process includes aligning a point cloud-snapshot from sensor data expressed with respect to the autonomous vehicle 100 against a 3D point cloud map created a priori. Following this example, an initial rough estimate of the vehicle with respect to the map can be used, and the point cloud-snapshot with respect to the map can be expressed using the rough estimate of where the vehicle is located. Moreover, alignment against the 3D point cloud map can be attempted. For instance, the difference in alignment between the two point clouds can describe the refinement that can be applied on the prior estimate to determine a more accurate location of the autonomous vehicle 100.

In some embodiments, an autonomous vehicle in accordance with this disclosure includes a computing system that can execute the data compression system 104 and/or the control system 230 in order to implement the compression functionality and/or the control functionality disclosed herein. The computing system can include one or more processors and other types of computing resources (e.g., memory device(s), bus architecture(s), controller devices(s), and the like) that can permit or otherwise facilitate the execution of the data compression system 104 and/or the control system 230. Accordingly, in such embodiments, the data compression system 104 and the control system 230 can be embodied in or can include machine-accessible instructions (e.g., computer-readable and/or computer-executable instructions) encoded or otherwise retained in one or more memory devices or machine-accessible non-transitory storage media. For example, each one of the data compression system 104 and the control system 230 can include components that can be built (e.g., linked and compiled) and retained in computer-executable form in the memory device(s) or the one or more machine-accessible non-transitory storage media.

Figure 4:
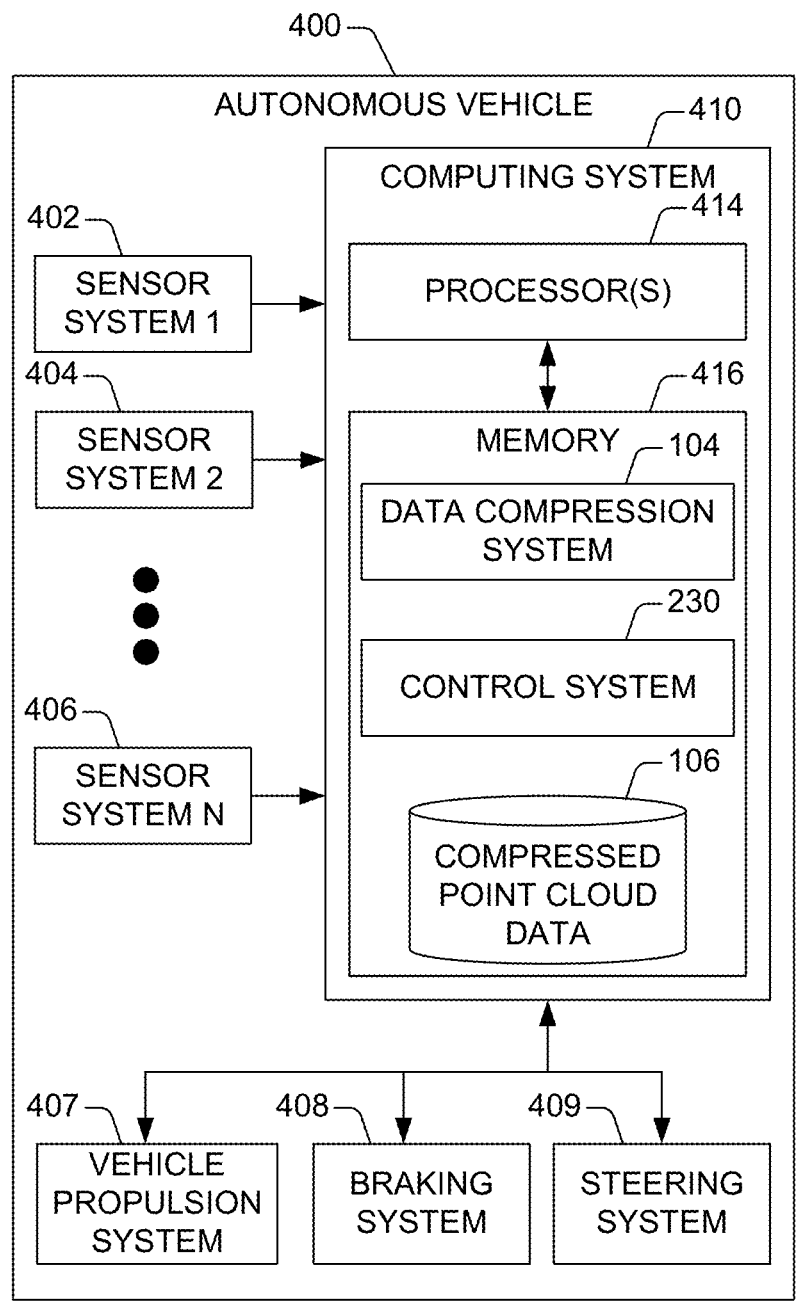
FIG. 4 illustrates another example of an autonomous vehicle in accordance with one or more embodiments of the disclosure.

As an illustration, FIG. 4 depicts an example of the autonomous vehicle 400 that includes a computing system 410 having one or more processor(s) 414 and one or more memory devices 416 (collective referred to as memory 416) that include computer-executable instructions that can be executed by at least one of the processor(s) 114. In one example, the processor(s) 114 can be embodied in or can include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), a combination thereof, or the like.

The memory 416 includes the data compression system 104. Specifically, as mentioned, machine-accessible instructions (e.g., computer-readable and/or computer-executable instructions) that embody or constitute the data compression system 104 are encoded or otherwise retained in the memory 416. Such instructions can be executed by at least one processor of the processor(s) 414. Execution of the instructions can cause the at least one processor—and, thus, the autonomous vehicle 400—to compress point cloud data and/or other types of data based at least on an integer representation having a defined number of bits, as is described herein. Compressed point cloud data can be retained in the memory 416, in the compressed point cloud data 106.

Consistent with aspects of this disclosure, various sensor systems can generate the point cloud data that is compressed by the autonomous vehicle 400. Accordingly, as is illustrated in FIG. 4, the autonomous vehicle 400 includes multiple sensor systems 402-406 (a first sensor system 402, a second sensor system 404, . . . , and a Nth sensor system 406). For example, the first sensor system 402 may be embodied in or can include a lidar sensor system, the second sensor system 404 may be embodied in or can include a radar sensor system, and the Nth sensor system 406 can be embodied in or can include an imaging sensor system. Other examples of sensor systems include GPS sensor systems, sonar sensor systems, infrared sensor systems, and the like. At least one of the sensor systems 402-406 can generate point cloud data in accordance with aspects of this disclosure. The sensor systems 402-406 can embody or constitute the sensor system 102 shown in FIG. 1.

A sensor system that generates point cloud data can send at least a portion of such data to the computing system 410. To that point, amongst others, the computing system 410 is functionally coupled to (e.g., in communication with) with at least one sensor of the sensor systems 402-406 and can receive point cloud data from the at least one sensor. Similar to other point cloud data in accordance with this disclosure, the point cloud data received from the at least one sensor system can be representative or otherwise indicative of a region relative to the autonomous vehicle 400.

As is further illustrated in FIG. 4, the autonomous vehicle 100 also can include several mechanical systems and/or electro-mechanical systems that can permit or otherwise facilitate effectuating appropriate motion of the autonomous vehicle 400. For instance, the mechanical systems and/or electro-mechanical systems can include a vehicle propulsion system 407, a braking system 408, and a steering system 409. The vehicle propulsion system 407 may be embodied in or can include, for example, an electric motor, an internal combustion engine, or a combination thereof. The braking system 408 can include an engine break, brake pads, actuator devices, and/or any other suitable componentry configured to permit or otherwise facilitate decelerating the autonomous vehicle 400. The steering system 410 includes suitable componentry configured to control a direction of motion of the autonomous vehicle 400.

The memory 416 also includes the control system 230. Specifically, machine-accessible instructions (e.g., computer-readable and/or computer-executable instructions) that embody or constitute the control system 230 are encoded or otherwise retained in the memory 416. Such instructions can be executed by at least one processor of the processor(s) 414. Execution of the instructions can cause the at least one processor—and, thus, the autonomous vehicle 400—to control the operation of the autonomous vehicle 400 based at least on results of processing a portion of the compressed point cloud data 106. To that point, the computing system 410 also is functionally coupled to (e.g., in communication with) the vehicle propulsion system 407, the braking system 408, and the steering system 409. As such, the autonomous vehicle 400 can control at least the vehicle propulsion system 407, the braking system 408, the steering system 409, other mechanical systems, and/or other electromechanical systems of the autonomous vehicle 400. As is disclosed herein, in sharp contrast to conventional technologies, such processing need not rely on prior decompression of the compressed point cloud data operated upon.

Figure 5:
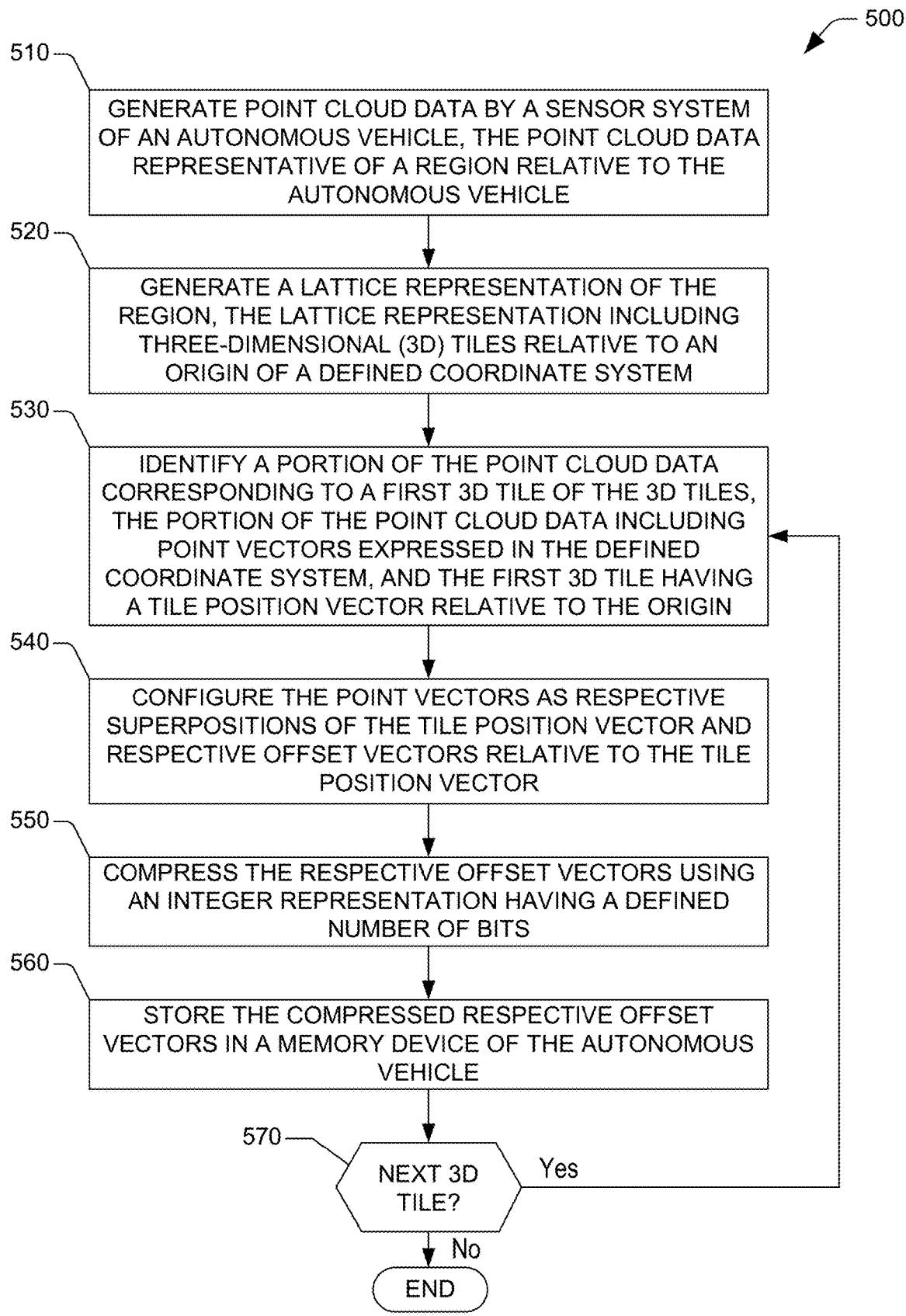
FIG. 5 illustrates an example of a method for compressing point cloud data, in accordance with one or more embodiment of the disclosure.
Figure 6:
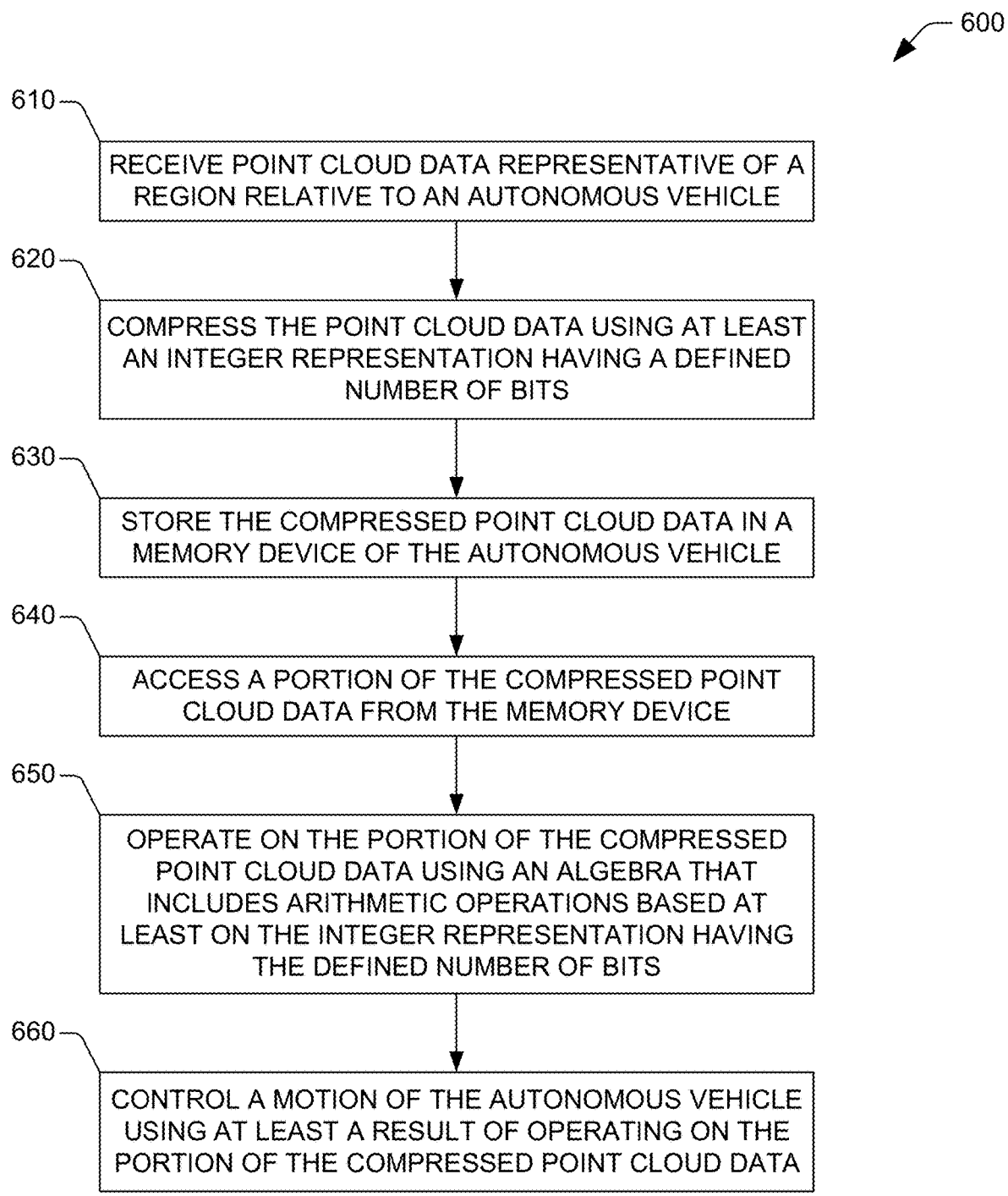
FIG. 6 illustrates an example of a method for controlling an autonomous vehicle in accordance with one or more embodiments of the disclosure.

FIG. 5 and FIG. 6 illustrate examples of the methods that emerge from the principles of this disclosure. While the exemplified methods are presented and described as a series of acts or operations that are performed in a sequence, the disclosure is not limited in that respect. Indeed, any one of the methods disclosed herein is not limited by the order (explicit or implied) of a specific sequence of acts or operations. For example, some acts or operations can occur in a different order than what is illustrated herein. In addition, an act or operation can occur concurrently with another act or operation. Further, in some instances, not all acts or operations may be required to implement a method or group of methods disclosed herein.

The acts or operations disclosed in connection with any of the methods in accordance with this disclosure may be machine-accessible instructions (e.g., computer-readable and/or computer-executable instructions) that can be executed or otherwise implemented by one or more processors and/or can be stored on a computer-readable medium or media. The machine-accessible instructions can include a routine, a sub-routine, programs, a thread of execution, and/or the like. Results of acts or operations of the methodologies can be stored in a computer-readable medium, displayed on a display device, and/or the like.

The example methods illustrated in FIGS. 5-6, and in some instances, combinations of such methods, can be performed by an autonomous vehicle in accordance with embodiments of this disclosure. For instance, the autonomous vehicle 100 illustrated in FIG. 1 and the autonomous vehicle 400 illustrated in FIG. 4 can implement the example method 600. Similar to other embodiments of the disclosure, while the example method 600 is illustrated with reference to point cloud data, such a method can be implemented for other types of data including numeric data elements.

Specifically, FIG. 5 illustrates an example method 500 for compressing point cloud data, in accordance with one or more embodiment of the disclosure. The example method 500 can be performed by an autonomous vehicle in accordance with embodiments of this disclosure. For instance, the autonomous vehicle 100 illustrated in FIG. 1 can implement the example method 500. Similar to other embodiments of the disclosure, while the example method 500 is illustrated with reference to point cloud data, such a method can be implemented for other types of data including numeric data elements.

At block 510, point cloud data can be generated by a sensor system of the autonomous vehicle that implements the example method 500. The sensor system can be embodied in or can include a lidar sensor system, a radar sensor system, a thermal sensor system, an imaging sensor system, a combination thereof, or the like. As mentioned, the point cloud data can represent a region relative to the autonomous vehicle.

At block 520 a lattice representation of the region can be generated by a computing compression system of the autonomous vehicle. The computing compression system can be embodied in the computing system 410. Thus, the computing compression system can include the data compression system 104. As is described herein, in some embodiments, the lattice representation can include multiple 3D tiles relative to an origin of a defined coordinate system (e.g., coordinate system {G}; see FIG. 1). Generating the lattice representation by the computing compression system can include configuring each one (or, in some embodiments, at least one) of the 3D tiles to have a cube shape that has a side length corresponding to a defined power of two (e.g., $2^N$) and is expressed in a defined unit of length (e.g., m, cm, or the like).

At block 530, the computing compression system can identify or otherwise determine a portion of the point cloud data that corresponds to a first 3D tile of the 3D tiles. The portion of the point cloud data includes a group of point vectors expressed in the defined coordinate system (e.g., coordinate system {G}). In addition, the first 3D tile has a tile position vector T relative to the origin of the defined coordinate system. In one aspect, the first 3D tile is configured to have a cube shape that has a side length corresponding to a defined power of two and is expressed in a defined unit of length.

At block 540, the computing compression system can configure the group of point vectors as respective superpositions of the tile position vector T and respective offset vectors relative to the tile position vector T. In one example, the computing compression system can configure a first point vector of the group of point vectors as a superposition of the tile position vector T and a first offset vector x relative to the tile position vector T.

At block 550, the computing compression system can compress the respective offset vectors using an integer representation having a defined number of bits (e.g., 8 bits, 16 bits, 32 bits, or the like). As is disclosed herein, the integer representation can be based at least on a fixed-point Q-format representation having a first subset of the defined number of bits (e.g., 7 bits) and a second subset of the defined number of bits (e.g., 9 bits) corresponding, respectively, to an integer portion of a number included in an offset vector and a fractional portion of the number. Further to the example above, the computing compression system can compress the first offset vector using such an integer representation having a defined number of bits.

Compressing the respective offset vectors using such an integer representation includes generating integer point coordinates in a range determined by the defined number of bits. To that end, in one embodiment, the compressing computing system can multiply each point coordinate of the respective offset vectors by a scaling factor based on the defined number of bits and can compute a ceiling function on the output of such multiplication. Further, compressing the respective offset vector includes replacing the respective offset vectors by the rational numbers based at least on the generated integer point coordinates, resulting in compressed respective offset vectors.

At block 560, the computing compression system can store the compressed respective offset vector in a memory device of the autonomous vehicle that implements the example method 500. The memory device can be included in or functionally coupled to the computing compression system. In embodiments in which the computing compressing system is embodied in the computing system 410, the memory device can be included in the memory 416.

At block 570, the computing compression system can determine if a next 3D tile is to be processed in order to continue with the compression of the point cloud data. In response to an affirmative determination, the flow of the example method 500 continues to block 530. In the alternative, in response to a negative determination, the example method 500 is terminated.

FIG. 6 illustrates an example method 600 for controlling an autonomous vehicle in accordance with one or more embodiment of the disclosure. In some embodiments, a computing system (e.g., computing system 410) of the autonomous vehicle can perform or otherwise implement the example method 600. At block 610, the computing system of an autonomous vehicle can receive point cloud data representative of a region relative to the autonomous vehicle. The computing system can be embodied in or can include, for example, the computing system 312 illustrated in FIG. 3. In some embodiment, the point cloud data can include defined non-empty sets of point cloud data. For example, a first set of the defined non-empty sets of point cloud data can include spatial reference data indicative of structures within the region, and a second set of the sets of defined non-empty sets of point cloud data can include point cloud data generated by a sensor system in accordance with this disclosure.

At 620, the computing system can compress the point cloud data using at least an integer representation having a defined number of bits (e.g., 8 bits, 16 bits, 32 bits, or the like). In some embodiments, the computing system can implement the example method 500 in order to compress the point cloud data. At block 630, the computing system can store the compressed point cloud data in a memory device of the autonomous vehicle that implements the example method 600.

At block 640, the computing system can access a portion of the compressed point cloud data from the memory device of the autonomous vehicle. At block 650, the computing system can operate on the portion of the compressed point cloud data using an algebra that includes arithmetic operations based at least on the integer representation having the defined number of bits. At block 660, the computing system can control a motion of the autonomous vehicle using at least a result of operating on the portion of the compressed point cloud data. As mentioned, in one embodiment, the computing system can control the motion of the autonomous vehicle by controlling at least one of a vehicle propulsion system of the autonomous vehicle, a braking system of the autonomous vehicle, and/or a steering system of the autonomous vehicle.

Figure 7:
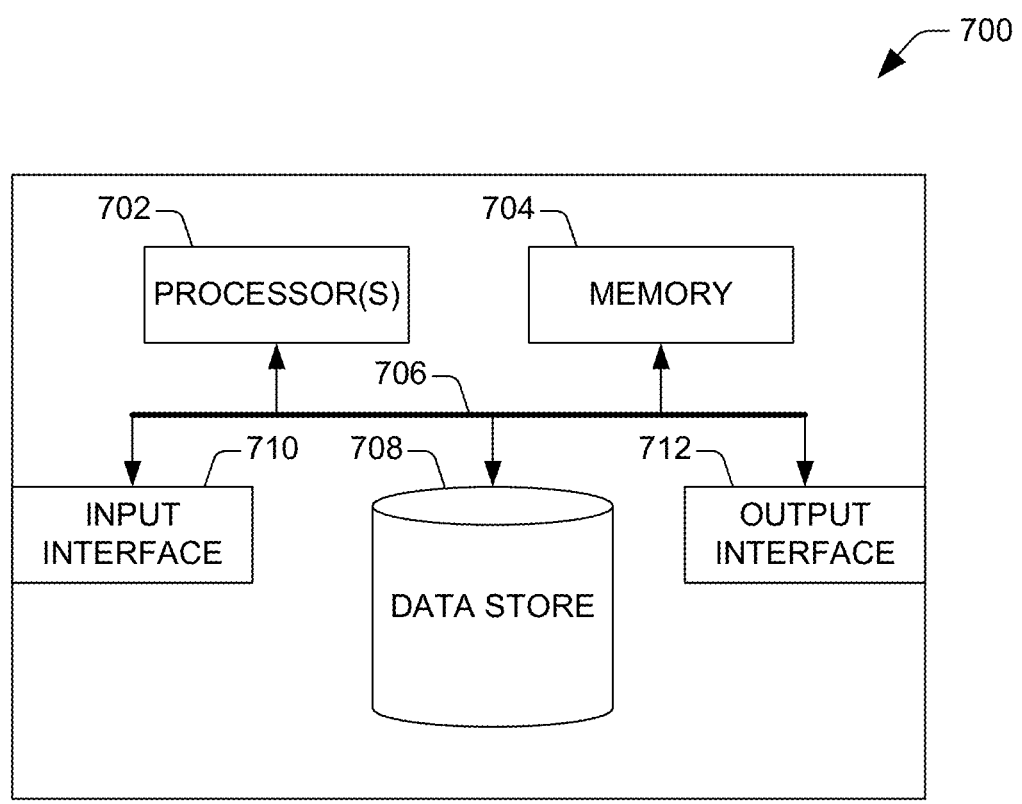
FIG. 7 is an example of a computing system that can implement the technologies disclosed herein, in accordance with one or more embodiments.

Referring now to FIG. 7, a high-level illustration of an exemplary computing device 700 that can be used in accordance with the systems and methodologies disclosed herein is illustrated. For instance, the computing device 700 may be or include the computing system 410. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store confidence scores, prior probability data, sensor data, training data, etc.

The computing device 700 additionally includes a data store 708 that is accessible by the processor 702 by way of the system bus 706. The data store 708 may include executable instructions, sensor data, probability data, training data, confidence scores, etc. The computing device 700 also includes an input interface 710 that allows external devices to communicate with the computing device 700. For instance, the input interface 710 may be used to receive data (e.g., point cloud data) and/or instructions from an external computing device, etc. The computing device 700 also includes an output interface 712 that interfaces the computing device 700 with one or more external devices. For example, the computing device 700 may transmit control signals to the vehicle propulsion system 407, the braking system 408, and/or the steering system 409 by way of the output interface 712.

While illustrated as a single system, it is noted that the computing device 700 may also be embodied in a distributed system. Thus, for instance, several devices may be in communication by way of a network connection and may collectively perform operations or tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
a sensor system that generates point cloud data representative of a region relative to the autonomous vehicle; and
a computing system functionally coupled to the sensor system, the computing system comprising:
at least one processor and
at least one memory device functionally coupled to the at least one processor, the at least one memory device having instructions encoded thereon that, in response to execution by the at least one processor, cause the computing system to perform operations comprising:
generating a lattice representation of the region, the lattice representation including three-dimensional (3D) tiles relative to an origin of a defined coordinate system;
identifying a portion of the point cloud data that corresponds to a first 3D tile of the 3D tiles, the portion of the point cloud data including point vectors expressed in the defined coordinate system, and the first 3D tile having a tile position vector relative to the origin of the defined coordinate system;
configuring a first point vector of the point vectors as a superposition of the tile position vector and a first offset vector relative to the tile position vector;
compressing the first offset vector using an integer representation having a defined number of bits, the integer representation based at least on a fixed-point Q-format representation and the compressing including:
generating an integer first point coordinate; and
replacing the first point coordinate by a rational number based at least on the integer first point coordinate; and
storing the compressed first offset vector in a first memory device of the at least one memory device.

2. The autonomous vehicle of claim 1, wherein the sensor system comprises at least one of a lidar sensor system, a radar sensor system, or an imaging sensor system.

3. The autonomous vehicle of claim 1, wherein the defined number of bits is one of 8 bits, 16 bits, or 32 bits.

4. The autonomous vehicle of claim 1, wherein the generating the lattice representation comprises generating a cubic lattice comprising cubes corresponding to the 3D tiles, each one of the cubes having a side length corresponding to a defined power of two and expressed in a defined unit of length.

5. The autonomous vehicle of claim 4, wherein the compressing comprises configuring the scaling factor to a second defined power of two having an exponent equal to a difference between the defined number of bits and an exponent of the defined power of two.

6. The autonomous vehicle of claim 1, wherein the compressing comprises configuring the defined number of bits to be 16 bits and further configuring the scaling factor to $2^9$.

7. The autonomous vehicle of claim 1, wherein the operations further comprise operating on at least the compressed first offset vector using an algebra that includes arithmetic operations based at least on the fixed-point Q-format representation, wherein the operating includes implementing a process to control, at least partially, the operation of the autonomous vehicle.

8. The autonomous vehicle of claim 7, further comprising a vehicle propulsion system, a braking system, and a steering system, wherein the operations further comprise controlling at least one of the vehicle propulsion system, the braking system, or the steering system using at least a result of the implemented process.

9. The autonomous vehicle of claim 8, wherein the operations further comprise:
compressing a portion of the point cloud data using the integer representation having the defined number of bits;
receiving second point cloud data; and
compressing a portion of the second point cloud data using the integer representation having the defined number of bits;
wherein the implementing the process comprises implementing a scene registration process between the compressed portion of the point cloud data and the compressed portion of the second point cloud data.

10. The autonomous vehicle of claim 9, wherein the implementing the scene registration process comprises implementing at least one of a principal component analysis (PCA) process, a single value decomposition (SVD) process, or an iterative closest point (ICP) process.

11. A method, comprising:
generating point cloud data by a sensor system of an autonomous vehicle, the point cloud data associated with a region at least neighboring the autonomous vehicle;
generating a lattice representation of the region by a computing compression system of the autonomous vehicle, the lattice representation including three-dimensional (3D) tiles relative to an origin of a defined coordinate system;
identifying, by the computing compression system, a portion of the point cloud data that corresponds to a first 3D tile of the 3D tiles, the portion of the point cloud data including point vectors expressed in the defined coordinate system, and the first 3D tile having a tile position vector relative to the origin of the defined coordinate system;
configuring, by the computing compression system, a first point vector of the point vectors as a superposition of the tile position vector and a first offset vector relative to the tile position vector;
compressing, by the computing compression system, the first offset vector using an integer representation having a defined number of bits, the integer representation based at least on a fixed-point Q-format representation and the compressing including:
multiplying a first point coordinate of the first offset vector by a scaling factor based on the defined number of bits, resulting in an integer first point coordinate, and
replacing the first point coordinate by the integer first point coordinate, resulting in a compressed first offset vector; and
storing, by the computing compression system, the compressed first offset vector in a memory device of the autonomous vehicle.

12. The method of claim 11, wherein the generating the lattice representation comprises configuring the first 3D tile to have a cube shape having a side length corresponding to a defined power of two and expressed in a defined unit of length.

13. The method of claim 12, wherein the compressing comprises configuring the scaling factor to a second defined power of two having an exponent equal to a difference between the defined number of bits and an exponent of the defined power of two.

14. The method of claim 11, wherein the compressing comprises configuring the defined number of bits to be 16 bits and further configuring the scaling factor to $2^9$.

15. The method of claim 11, further comprising operating, by a control system of the autonomous vehicle, on at least the compressed first offset vector using an algebra that includes arithmetic operations based at least on the fixed-point Q-format representation, wherein the operating includes implementing a process to control, at least partially, the operation of the autonomous vehicle.

16. The method of claim 15, further comprising controlling, by the control system, a motion of the autonomous vehicle using at least a result of the implemented process.

17. The method of claim 16, further comprising:
compressing, by the computing compression system, a portion of the point cloud data using the integer representation having the defined number of bits;
receiving second point cloud data; and
compressing, by the computing compression system, a portion of the second point cloud data using the integer representation having the defined number of bits;
wherein the implementing the process comprises implementing a scene registration process between the compressed portion of the point cloud data and the compressed portion of the second point cloud data.

18. An autonomous vehicle, comprising:
at least one processor; and
at least one memory device functionally coupled to the at least one processor, the at least one memory device having instructions encoded thereon that, in response to execution, cause the at least one processor to perform or facilitate operations comprising:
receiving point cloud data representative of a region surrounding the autonomous vehicle;
generating a lattice representation of the region, the lattice representation including three-dimensional (3D) tiles relative to an origin of a defined coordinate system;
identifying a portion of the point cloud data that corresponds to a first 3D tile of the 3D tiles, the portion of the point cloud data including point vectors expressed in the defined coordinate system, and the first 3D tile having a tile position vector relative to the origin of the defined coordinate system;
configuring the point vectors as respective superpositions of the tile position vector and respective offset vectors relative to the tile position vector;
compressing the respective offset vectors using an integer representation having a defined number of bits; and
storing the compressed respective offset vectors in a memory device of the autonomous vehicle.

19. The autonomous vehicle of claim 18, wherein the integer representation is based at least on a fixed-point Q-format representation, and wherein the compressing comprises:
multiplying a first point coordinate of the first offset vector by a scaling factor based on the defined number of bits, resulting in an integer first point coordinate, and replacing the first point coordinate by the integer first point coordinate.

20. The autonomous vehicle of claim 19, wherein the scaling factor is determined by a subset of the defined number of bits, and wherein the first 3D tile has a cube shape having a side length corresponding to a defined power of two, the exponent of the defined power of two corresponding to a difference between the defined number of bits and the subset of the defined number of bits.

* * * * *